J. W. LEWIS, OF OREGON CITY, OREGON.

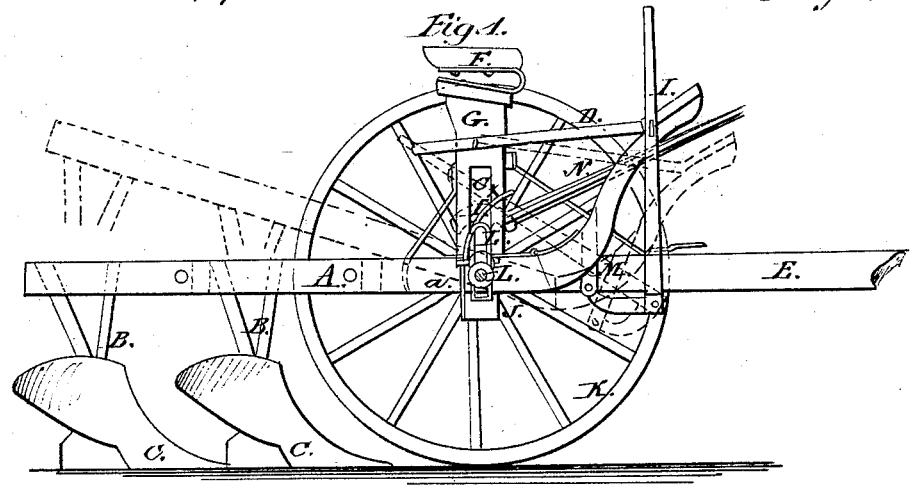
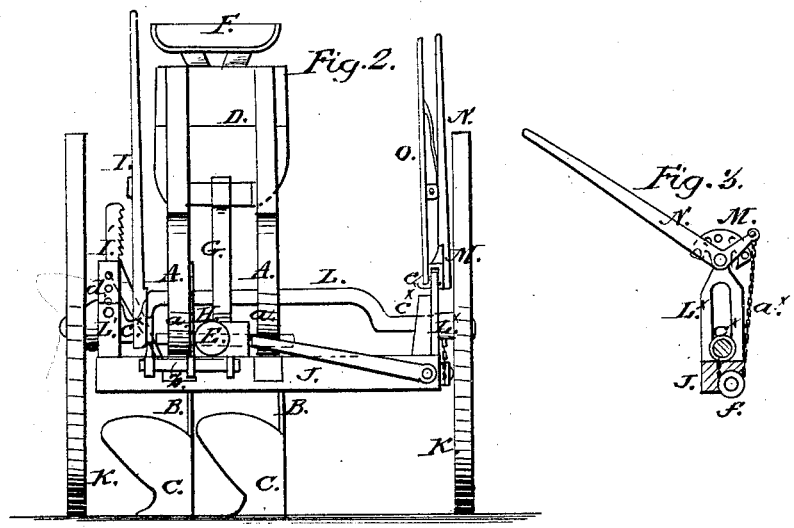
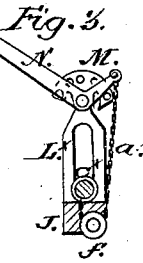
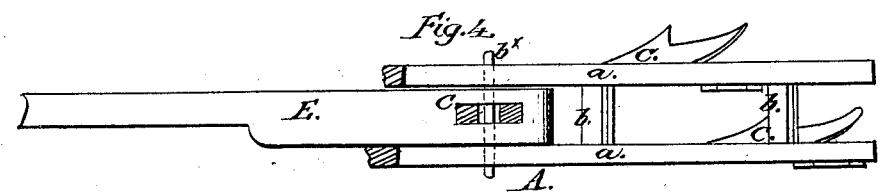

Letters Patent No. 90,178, dated May 18, 1869.

IMPROVEMENT IN GANG-PLOWS.

The Schedule referred to in these Letters Patent and making part of the same.

*To all whom it may concern:*

Be it known that I, J. W. LEWIS, of Oregon City, in the county of Clackamas, and State of Oregon, have invented a new and improved Gang-Plow; and I do hereby declare that the following is a full, clear, and exact description thereof, which will enable those skilled in the art to make and use the same, reference being had to the accompanying drawings, forming part of this specification.

This invention relates to a new and improved gang-plow; and

It consists in a peculiar construction and arrangement of parts, as hereinafter fully shown and described, whereby several advantages are obtained, which are fully set forth in the following description.

In the accompanying sheet of drawings—

Figure 1 is a side sectional view of my invention, taken in the line $x\ x$, fig. 2.

Figure 2, a front view of the same.

Figure 3, a detached side view of a part pertaining to the same.

Figure 4, a plan or top view of the frame of the machine, partly in section, and all the working-parts detached.

Similar letters of reference indicate corresponding parts.

The frame A of the device is composed of two parallel bars, $a\ a$, connected by cross-pieces $b$.

The plow-standards B B are attached to these bars $a\ a$, one to each;

C being the plows, which may be of the usual or any proper shape, to turn properly a furrow-slice.

The bars $a\ a$ of the frame A curve upward at their front parts, as shown clearly in fig. 1; and a platform, D, for the driver's feet, is secured to the upper ends of said curved portions.

E is the draught-pole, the rear end of which is secured by a bolt, $b^\times$, between the front part of the bars $a\ a$; and F is the driver's seat, which is secured to the top of an upright, G, on the rear part of the draught-pole.

To the front part of one of the bars $a$ of the frame A, one arm of a toggle, H, is attached, the other arm being secured to a shaft, $b$, underneath the draught-pole, said shaft having a lever, I, at one end of it.

By means of this toggle-arrangement, and by the driver throwing his weight on the platform D, the rear part of the frame A may be readily tilted upward, and the plows raised out of the ground, the plows being held in a raised position by catching the lever I into a curved rack, $I^\times$, attached to a cross-bar, J, of the frame A.

The plows are shown in a raised position in red outline in fig. 1.

The machine is mounted on two wheels, K K, the axle L of which is curved, or bent in crank-form, and passes through a vertical slot, $c$, in the upright G, which supports the driver's seat, said slot serving as a guide for the axle, the ends, or arms $c^\times\ c^\times$ of the axle on which the wheels K K turn loosely, being fitted in guides $L'\ L^\times$ at the ends of the cross-bar J.

One of these guides, $L'$, has a series of holes made through it, to receive a pin, $d$, by adjusting which the side of the frame near said guide may be set higher or lower, as desired.

The other guide, $L^\times$, at the opposite side of the machine, has a segment, M, at its upper end, perforated with holes, and having a bent lever, N, attached, provided with a catch, or fastening, composed of a lever, O, having a pin, $e$, projecting from its lower end, to fit into any of the series of holes in the segment-bar M, and secure lever N in the desired position.

To the short arm of this lever N, there is attached a chain, $a^\times$, which extends down around a pulley, $f$, at one end of the cross-bar J, and then extending upward, is connected to the axle L, or rather to one of the arms $c^\times$ thereof.

The lever N is within convenient reach of the driver on seat F, and by adjusting this lever it will be seen that the left-hand side (landside) of the frame may be set higher or lower, as desired, to suit the required depth of furrow, and at any time when the machine is in motion.

I claim as new, and desire to secure by Letters Patent—

1. The main frame A and draught-pole E, with the platform D for the driver's feet, and the seat F, in combination with the toggle H, lever I, and the rack $I^\times$, all constructed and arranged substantially as and for the purpose specified.

2. The pivoted bar J, guides $L'\ L^\times$, pin $d$, lever N, carrying the catch O $e$, the chain $a^\times$, and pulley $f$, in combination with the axle L, substantially as described, for the purpose specified.

J. W. LEWIS.

Witnesses:
J. N. SHATTUCK,
J. C. FORBES.